(12) United States Patent
LaFarre et al.

(10) Patent No.: US 8,001,711 B2
(45) Date of Patent: Aug. 23, 2011

(54) ROLLABLE DISPLAY DEVICE WITH STRAIN REDUCTION

(75) Inventors: Raymond W. L. LaFarre, Eindhoven (NL); Bas J. E. van Rens, Son (NL)

(73) Assignee: Creator Technology B.V., Breda (NL)

( * ) Notice: Subject to any disclaimer, the term of this patent is extended or adjusted under 35 U.S.C. 154(b) by 1105 days.

(21) Appl. No.: 11/569,386

(22) PCT Filed: May 16, 2005

(86) PCT No.: PCT/IB2005/051585
§ 371 (c)(1),
(2), (4) Date: Nov. 20, 2006

(87) PCT Pub. No.: WO2005/114309
PCT Pub. Date: Dec. 1, 2005

(65) Prior Publication Data
US 2007/0216639 A1    Sep. 20, 2007

Related U.S. Application Data

(60) Provisional application No. 60/573,242, filed on May 21, 2004.

(51) Int. Cl.
*G09F 7/02* (2006.01)

(52) U.S. Cl. .......................................... 40/515; 40/517

(58) Field of Classification Search ................. 40/317, 40/334, 514–517
See application file for complete search history.

(56) References Cited

U.S. PATENT DOCUMENTS

| 2,111,362 A * | 3/1938 | Fisher .............................. 40/335 |
| 2002/0070910 A1 | 6/2002 | Fujieda et al. |
| 2003/0077453 A1 | 4/2003 | Oaku et al. |
| 2006/0207731 A1* | 9/2006 | Lukos ........................... 160/392 |

FOREIGN PATENT DOCUMENTS

| WO | 04001704 | 12/2003 |
| WO | 2004031927 | 4/2004 |

OTHER PUBLICATIONS

"Displays zum Aufrollen", Von Helmuth Lemme, Bauelemente Elektronisches Papier, www.elektroniknet.de, XP001168498, pp. 56-61.

* cited by examiner

*Primary Examiner* — Cassandra Davis

(57) ABSTRACT

A rollable display device including an inner housing (102) having an inner slot (108), a rollable display (106) having a bend portion (118), which is disposed through the inner slot (108), and a strain reducer (100) operably connected to the rollable display (106) to reduce strain at the bend portion (118). The strain reducer (100) acts by increasing radius of the bend portion (31), locating a neutral line of the rollable display (106) at a selected layer of the bend portion (31), and/or reducing cycling of the bend portion (31).

23 Claims, 6 Drawing Sheets

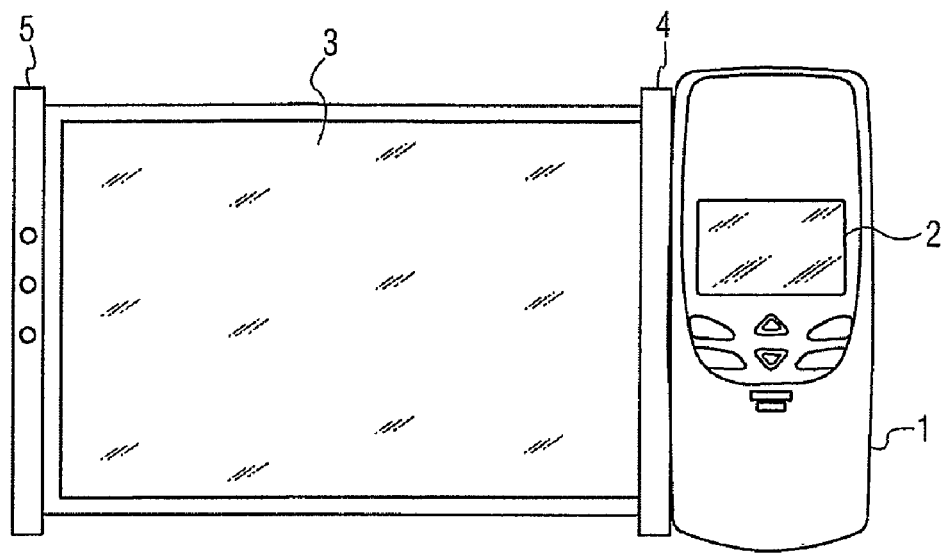
PRIOR ART FIG. 1
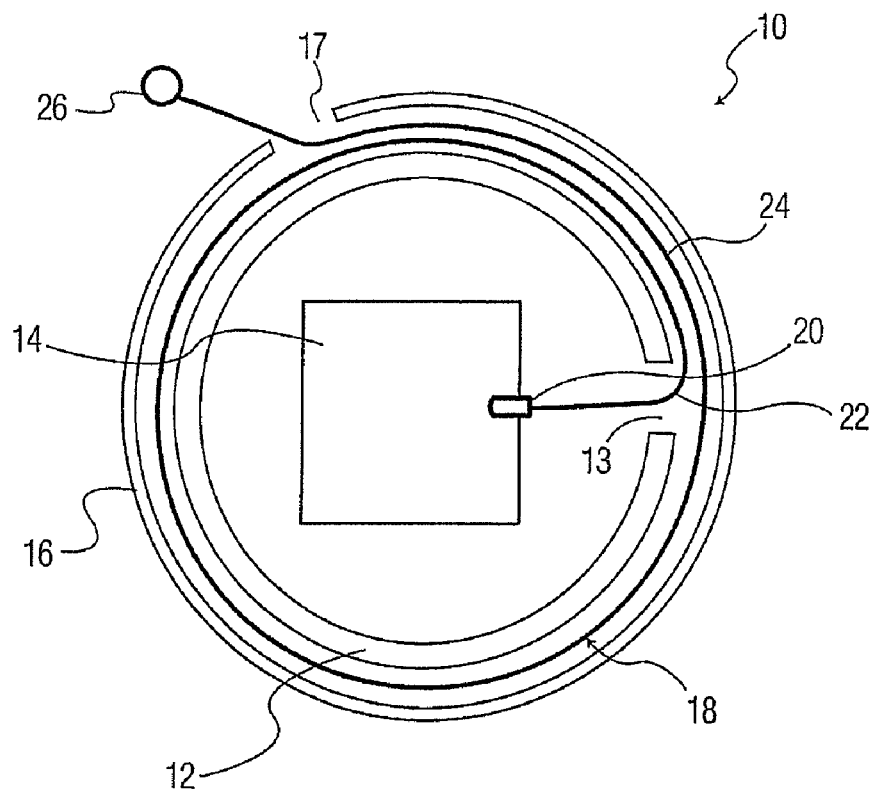
FIG. 2
PRIOR ART

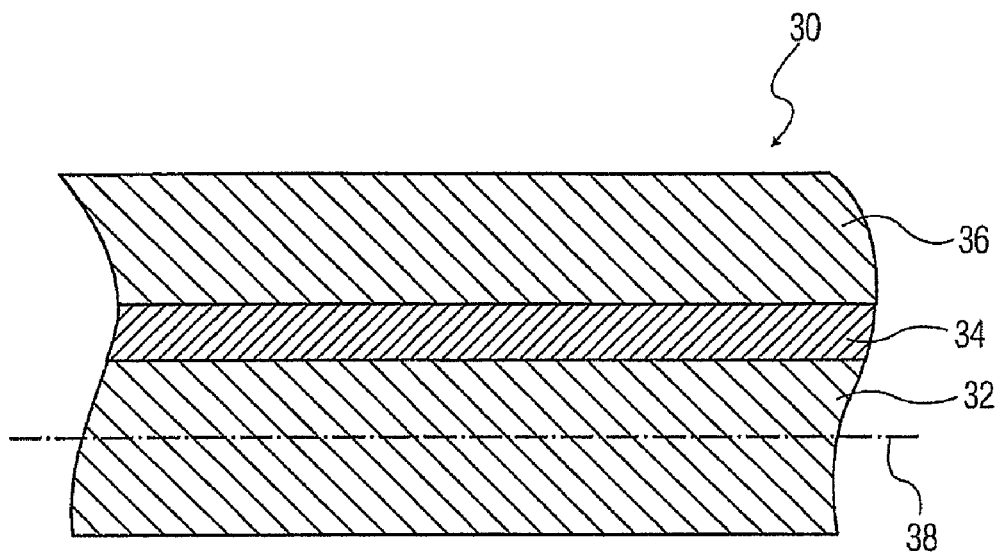
PRIOR ART  FIG. 3
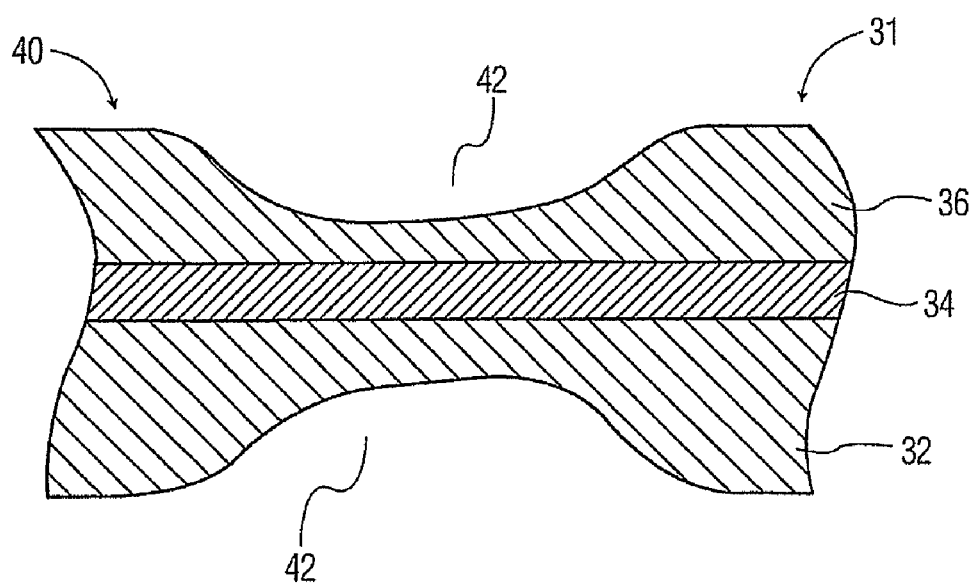
FIG. 4

ROLLABLE DISPLAY DEVICE WITH STRAIN REDUCTION

CROSS REFERENCE TO RELATED CASES

Applicants claim the benefits of Provisional Application Ser. No. 60/573,242, filed May 21, 2004 and International Application No. PCT/IB2005/051585, filed May 16, 2005.

FIELD OF THE INVENTION

This invention relates generally to rollable display devices, and more specifically to rollable display devices with strain reduction.

BACKGROUND

Miniaturization and increased processing power has recently allowed great increases in the portability of electronics. Complex devices have been reduced to pocket size. Consumers are able to carry and use wherever they desire such devices as cellular telephones, music players, game players, still and motion digital cameras, and GPS locators. Still, the size and form factor of the devices is often limited by the optical display because most devices currently use an inflexible glass optical display. Such displays are bulky, fragile, and difficult to replace when damaged.

To obtain even greater portability and avoid the drawbacks of glass optical displays, rollable displays have been developed. FIG. 1 is a front view of an exemplary use of a rollable display as disclosed in International Publication Nos. WO 2004/001704 A1 and WO 2004/031927 A2 to Bas J. E. van Rens, both entitled "Apparatus with Display" and both incorporated herein by reference in their entirety. In this embodiment, a rollable display 3 is unrolled from a housing 4,5 into the usable position illustrated. The mobile telephone 1 provides the input to the rollable display 3. In an alternative embodiment, the electronics providing the input to the rollable display, such as the mobile telephone or other electronics, is enclosed in one of the housings.

FIG. 2 is a cross section view of a rollable display device. The rollable display device 10 includes an inner housing 12, such as an inner cylinder, housing the electronics 14, and an outer housing 16, such as an outer cylinder, disposed about the inner housing 12. The wall of the inner housing 12 forms an inner slot 13 and the wall of the outer housing 16 forms an outer slot 17. A rollable display 18 includes a connection portion 20, a bend portion 22, a rolled portion 24, and an external portion 26. The rollable display 18 is connected to the electronics 14 by the connection portion 20, passes through the inner slot 13 at the bend portion 22, wraps around the inner housing 12, and exits the outer housing 16 at the external portion 26. In operation, the rollable display 18 is deployed for use by extending the rolled portion 24 through the outer slot 17. The rolled portion 24 is extended and retracted manually or by motor power.

One problem with rollable display devices is that the repetitive strain of rolling and unrolling the rollable display for use damages the rollable display. The rolled portion 24 typically makes a gradual, large-radius curve around the inner housing 12, so the stress and resulting strain is limited below a design threshold, preventing damage. A radius greater than 7 millimeters for a 100 μeter thick rollable display typically holds strains in the electrically active region of the rollable display below a 1 percent limit. However, the sharp bending of the display 18 at the bend portion 22 exceeds the design threshold and damages the rollable display 18 over time from repetitive strain. Examples of display failures include broken circuits, layer delamination, cracking, and buckling. Such failures may prevent the rollable display from rolling and unrolling, may reduce the image quality of the rollable display, or may prevent the rollable display from functioning. Excessive strain in the bend portion 22 may also interfere with the connection of the rollable display 18 to the electronics 14 at the connection portion 20.

FIG. 3 is a cross section view of a portion of a rollable display. In the example shown, the rollable display 30 includes a first layer 32, a second layer 34, and a third layer 36. Typically, the layers are laminated together to form the rollable display 30. The first layer 32 is typically a substrate for supporting the much thinner second layer 34, which is typically a fragile electronics layer. The third layer 36 is typically an electronic ink layer responsive to electrical charge from the second layer 34 to display text or graphical information to the user. The rollable display 30 has a neutral line 38, which is free of stress when the rollable display 30 is bent, such as when bending the rolled portion around the inner housing or the bend portion through the inner slot. The location of the neutral line 38 depends on the thickness and modulus of elasticity of each layer making up the rollable display 30. When bent, the rollable display 30 is in tension on one side of the neutral line 38 and in compression on the other side. Repeated cycling of the rollable display 30 to a radius smaller than the minimum design radius can result in failure of the rollable display 30.

SUMMARY OF THE INVENTION

It would be desirable to have a rollable display device with strain reduction that overcomes the above disadvantages.

One aspect of the present invention provides a rollable display device including an inner housing having an inner slot, a rollable display having a bend portion, which is disposed through the inner slot, and a strain reducer operably connected to the rollable display to reduce strain at the bend portion.

Another aspect of the present invention provides a rollable display device including an inner housing having an inner slot, an outer housing rotatable about the inner housing, a rollable display having a bend portion, which is disposed through the inner slot, and means for reducing strain of the bend portion.

Another aspect of the present invention provides a rollable display device including an inner housing having an inner slot and an opening; an outer housing rotatable about the inner housing, and having an outer slot and a cavity; a rollable display disposed through the inner slot and the outer slot; a bolt slidably disposed in the opening; and a spring urging the bolt toward the outer housing; wherein the bolt is received in the cavity when a desired length of the rollable display is positioned between the inner slot and the outer slot.

BRIEF DESCRIPTION OF THE DRAWINGS

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

FIG. 1 is a front view of an exemplary use of a rollable display;

FIG. 2 is a cross section view of a rollable display device;

FIG. 3 is a cross section view of a portion of a rollable display;

FIGS. 4-6 are cross section views of a bend portion of a rollable display with strain reduction made in accordance with the present invention;

DETAILED DESCRIPTION OF THE DRAWINGS

Figure 5:
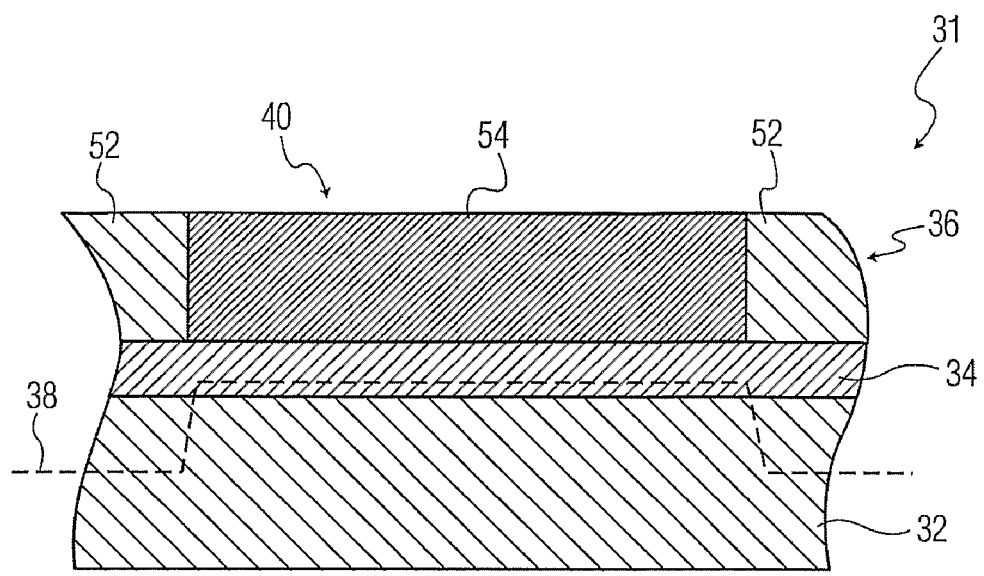
Figure 6:
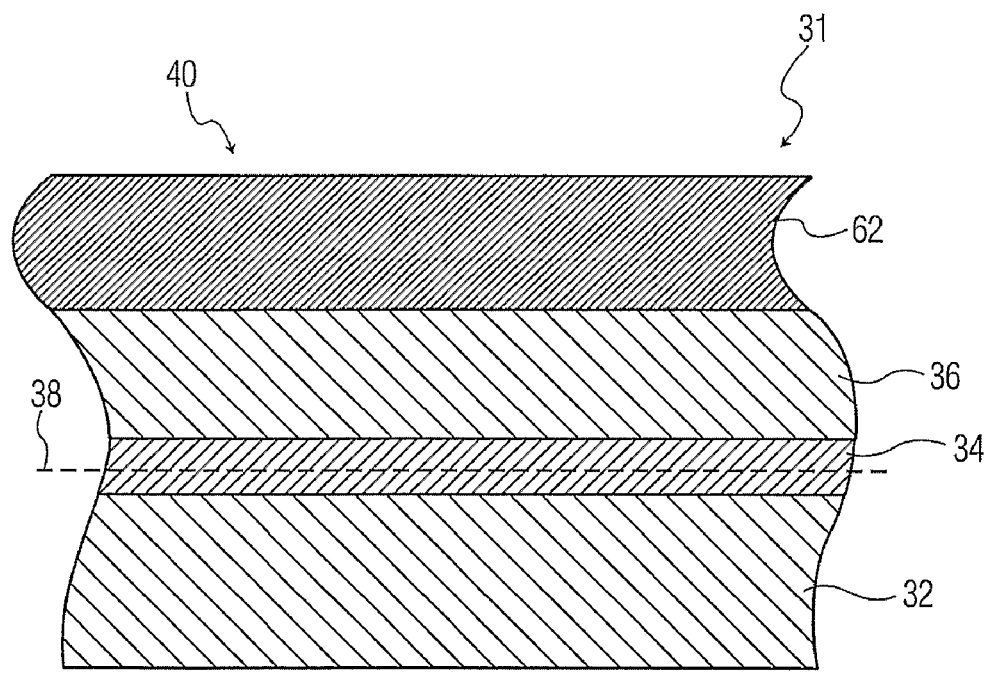

FIGS. 4-6, in which like elements share like reference numbers, are cross section views of a bend portion of a rollable display with strain reduction made in accordance with the present invention. FIG. 4 provides an example of strain reduction by increasing radius of the bend portion. FIGS. 5 & 6 provide examples of strain reduction by location the neutral line at a selected layer of the bend portion.

Referring to FIG. 4, the bend portion 31 of a rollable display includes first layer 32, second layer 34, and third layer 36, typically being the substrate, electronics, and electronic ink layers, respectively. In one embodiment, the electronics layer is the selected fragile layer that is most in need of protection by strain reduction. In alternative embodiments, other layers can be the selected layer. The definition of layer is not limited to discrete layers, but includes transitional layers. For example, the second layer 34 as shown can be a transition layer between the first layer 32 and third layer 36 where the first layer 32 and third layer 36 are joined by lamination, adhesive bonding, or the like. The strain reducer 40 includes channels 42 formed in the first layer 32 and the third layer 36 parallel to the central axis of the rollable display when rolled. The channels 42 act as strain reducers by thinning the rollable display at the bend portion 31, which increases the radius of the bend at the inner slot in the inner housing. A larger bend radius reduces strain from repetitive cycling and protects the selected fragile layer from damage. In an alternative embodiment, only a single channel 42 is formed in the first layer 32 or the third layer 36, rather than both layers, as the strain reducer 40. In an alternative embodiment, the thickness of the channel 42 is selected to locate the neutral line of the bend portion 31 at a selected layer.

FIGS. 5 & 6 provide examples of strain reduction by location the neutral line at a selected layer of the bend portion. FIG. 5 uses an alternative material portion in one of the layers as the strain reducer and FIG. 6 uses an additional layer as the strain reducer.

Referring to FIG. 5, the strain reducer 40 includes an alternative material portion 54 disposed in the third layer 36 of the bend portion 31 parallel to the central axis of the rollable display when rolled. The material of the alternative material portion 54 is a different material than the original third layer material 52 and is selected for its modulus of elasticity so that the neutral line 38 is at the selected layer. The alternative material portion 54 can be of any desired thickness to move the neutral line 38 to the desired layer, i.e., thinner, thicker, or the same thickness as the third layer material 52. In the example shown, the neutral line 38 is located in the second layer 34 under the alternative material portion 54 and in the first layer 32 under the original third layer material 52. The second layer 34 is typically the fragile electronics layer. Locating the neutral line at the selected layer as used herein includes locating the neutral line near the selected layer. The neutral line need not be precisely on the selected layer to effect the desired strain reduction. Strain is proportional to the distance between the selected layer and the neutral line, so any reduction in the distance provides stress reduction. In one example, effective stress reduction is provided by locating the neutral line within 20 μmeters of a 2 μmeters thick electronics layer in a 100 μmeters thick display.

The alternative material portion 54 can be made of any polymer, plastic, or other material compatible with the surrounding materials and providing the desired modulus of elasticity. Exemplary materials include polyamide, polyethylene terephthalate (PET), and the like. In one embodiment, the alternative material portion 54 is formed of a uniform material. In an alternative embodiment, the alternative material portion 54 is formed of layers of material. In another alternative embodiment, the alternative material portion 54 is formed of two or more interspersed materials, such as spheres or voids dispersed in another material. Those skilled in the art will appreciate that additional alternative material portions can be included in other layers on both or either side of the neutral line to precisely locate the neutral line.

Referring to FIG. 6, the strain reducer 40 includes a fourth layer 62 disposed on the third layer 36 of the bend portion 31 to locate the neutral line 38 at a selected layer of the bend portion 31. The thickness and modulus of elasticity of the fourth layer 62 are selected to locate the neutral line 38 as desired. Locating the neutral line at the selected layer as used herein includes locating the neutral line near the selected layer. The fourth layer 62 can be formed of a single or multiple materials, in a uniform layer or in a more complex configuration, such as spheres or layers. The fourth layer 62 can be made of any polymer, plastic, or other material compatible with the surrounding materials and providing the desired modulus of elasticity. Exemplary materials include polyamide, polyethylene terephthalate (PET), and the like. Those skilled in the art will appreciate that layers can be applied on both or either side of the neutral line to precisely locate the neutral line.

Figure 7:
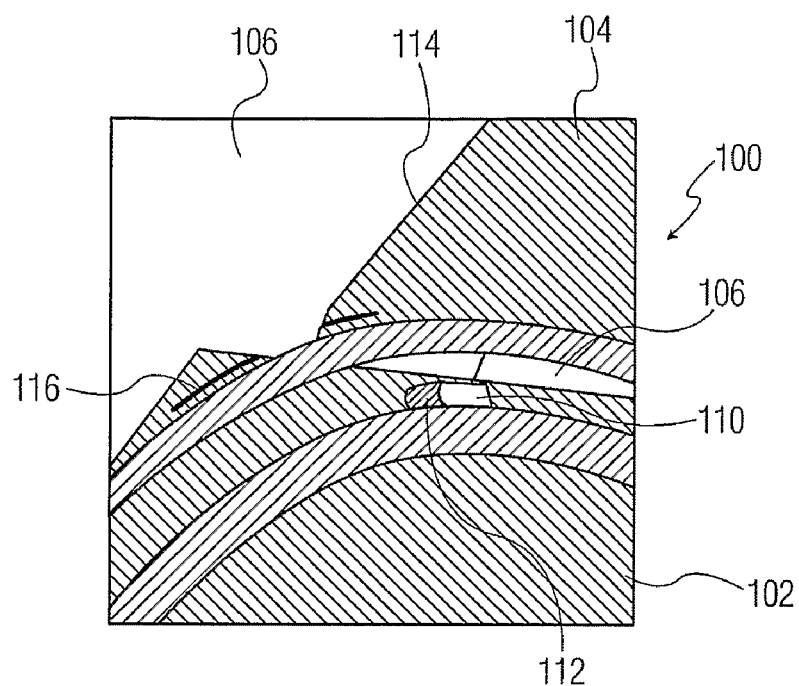
FIGS. 7 & 8 are perspective views of an alternative embodiment of a rollable display device with strain reduction made in accordance with the present invention.
Figure 8:
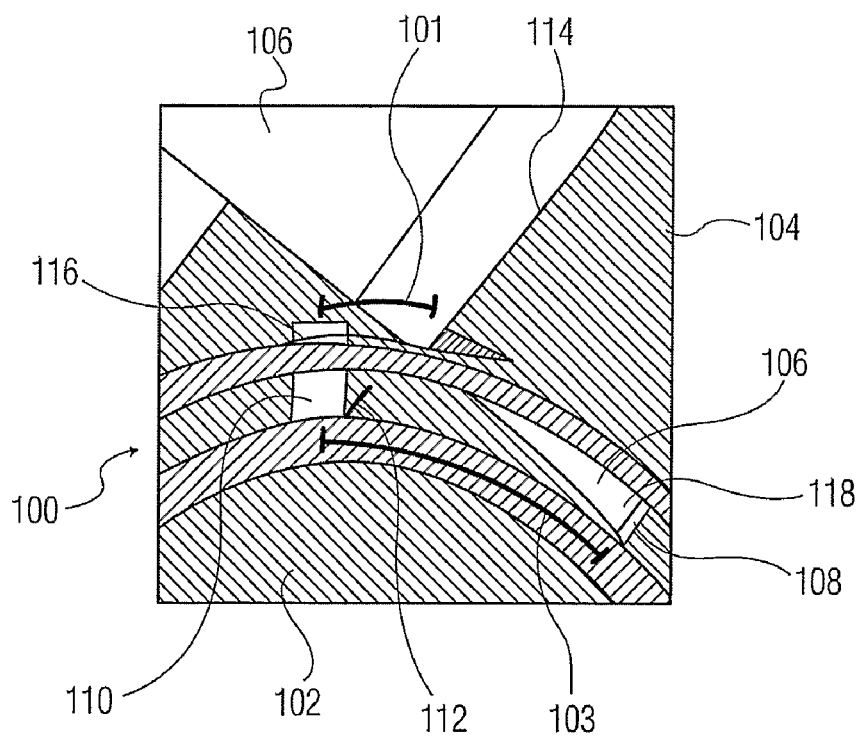

FIGS. 7 & 8, in which like elements share like reference numbers, are perspective views of an alternative embodiment of a rollable display device with strain reduction made in accordance with the present invention. FIGS. 7 & 8 show the strain reducer disengaged and engaged, respectively. The strain reducer maintains a desired length of the rollable display within the outer housing, reducing cycling and repetitive stress at the bend portion.

An outer housing 104 is rotatably disposed about an inner housing 102. The inner housing 102 includes an inner slot 108 and the outer housing 104 includes an outer slot 114. The rollable display 106 is connected to the inner housing 102 and has a bend portion 118, which is located at the inner slot 108 of the inner housing 102 where the rollable display 106 passes through the inner housing 102. The rollable display 106 passes through the outer slot 114 of the outer housing 104. In operation, the rollable display 106 rolls around the inner housing 102 when the rollable display 106 is retracted into the outer housing 104.

The strain reducer 100 includes a bolt 110 slidably disposed in an opening 112 in the inner housing 102 and a cavity 116 formed in the outer housing 104. A spring (not shown), such as a leaf spring or a coil spring, urges the bolt 110 toward the outer housing 104. The cavity 116 is located a first distance 101 from the outer slot 114 and the opening 112 is located a second distance 103 from the inner slot 108. In one embodiment, the cavity 116 passes through the wall of the outer housing 104. In an alternative embodiment, the cavity 116 passes part way into the wall of the outer housing 104.

Referring to FIG. 7, the bolt 110 is depressed into the opening 112 by the rollable display 106 when the strain reducer 100 is disengaged. The rollable display 106 separates the bolt 110 from the outer housing 104. Referring to FIG. 8, the rollable display 106 moves through the outer slot 114 as the rollable display 106 is deployed through the outer slot 114. When the bolt 110 is aligned with the cavity 116, the bolt 110 is received in the cavity 116 so that the strain reducer 100 is engaged. In one embodiment, the engaged strain reducer 100 prevents further motion of the inner housing 102 relative to the outer housing 104. This assures that a desired length of the rollable display 106 remains within the outer housing 104, avoiding cycling and repetitive strain on the bend portion 118. The desired length is set by the difference between the first distance 101 and the second distance 103. The desired length is independent of the total length of the rollable display 106, allowing the rollable display device to be used with different length rollable displays. When the rollable display 106 is retracted into the outer housing 104, the rollable display 106 urges the bolt 110 toward the opening 112.

Figure 9:
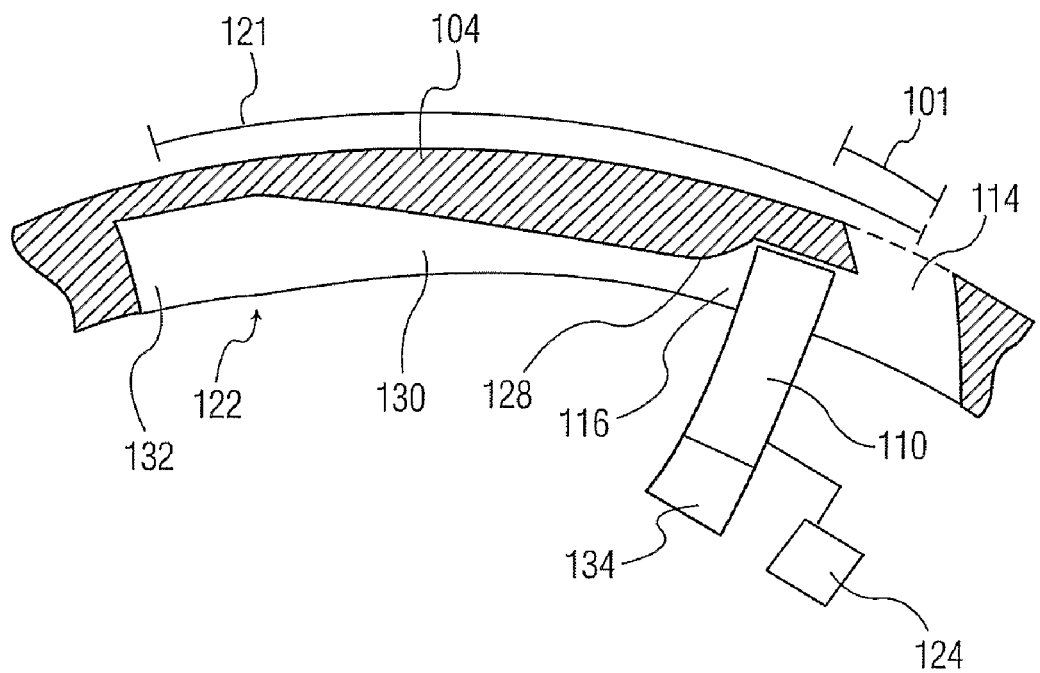
FIG. 9 is cross section view of an alternative embodiment for an extended cavity of a rollable display device with strain reduction made in accordance with the present invention.

FIG. 9 is cross section view of an alternative embodiment for an extended cavity of a rollable display device with strain reduction made in accordance with the present invention. The extended cavity 122 is formed in the outer housing 104. The extended cavity 122 includes a first cavity 116 at a first distance 101 from the outer slot 114, a second cavity 132 at a third distance 121 from the outer slot 114, and a transition cavity 130 connecting the first cavity 116 and the second cavity 132. The transition cavity 130 includes a bump 128 near the first cavity 116. A spring 134 urges bolt 110, which is coupled to the inner housing (not shown), toward the outer housing 104.

In operation, the bolt 110 is depressed toward the inner housing by the rollable display (not shown), until the bolt 110 is aligned with the first cavity 116 through the relative rotation of the inner housing and the outer housing 104. When aligned, the bolt 110 is received in the first cavity 116 and further relative rotation impeded by the bump 128. When the bolt 110 is received in the first cavity 116, a desired length of the rollable display remains between the outer slot 114 and the inner slot (not shown) to reduce cycling of the bend portion and provide strain reduction. By applying sufficient torque between the inner housing and the outer housing 104, the bolt 110 passes the bump 128, passes through the transition cavity 130, and rotates into the second cavity 132. The relative rotation of the inner housing and the outer housing 104 is stopped when the bolt 110 is received in the second cavity 132. In one embodiment, the third distance 121 is equal to the distance between the bolt 110 and the inner slot (the second distance 103 of FIG. 8), so that the inner slot and outer slot 114 are aligned when the bolt 110 is received in the second cavity 132. Alignment of the inner slot and outer slot 114 permits removal and replacement of the rollable display. Certain configurations of the rollable display device provide electronics within the inner housing and a connection portion of the rollable display connectable to the electronics. The connection portion is detachable from the electronics when the inner slot is aligned with the outer slot 114.

In an alternative embodiment, the bolt 110 is coupled to a switch 124 responsive to the position of the bolt 110. The switch 124 has two or more states depending on the position of the bolt 110. In one embodiment, the switch 124 has one state when the bolt is separated from the outer housing 104 by the rollable display and another state when the bolt 110 is received in the first cavity 116. In another embodiment, the switch 124 has yet another state when the bolt 110 is received in the second cavity 132, such as when the inner slot and outer slot 114 are aligned. In various embodiments, the state of the switch is used to control switching power to a drive motor for advancing and retracting the rollable display, switching power to the electronics within the inner housing, switching electronics operating mode, switching power to the image on the rollable display, switching power to a lock allowing connection and detachment of the rollable display at the inner housing, and/or other functions of the rollable display device.

Figure 10:
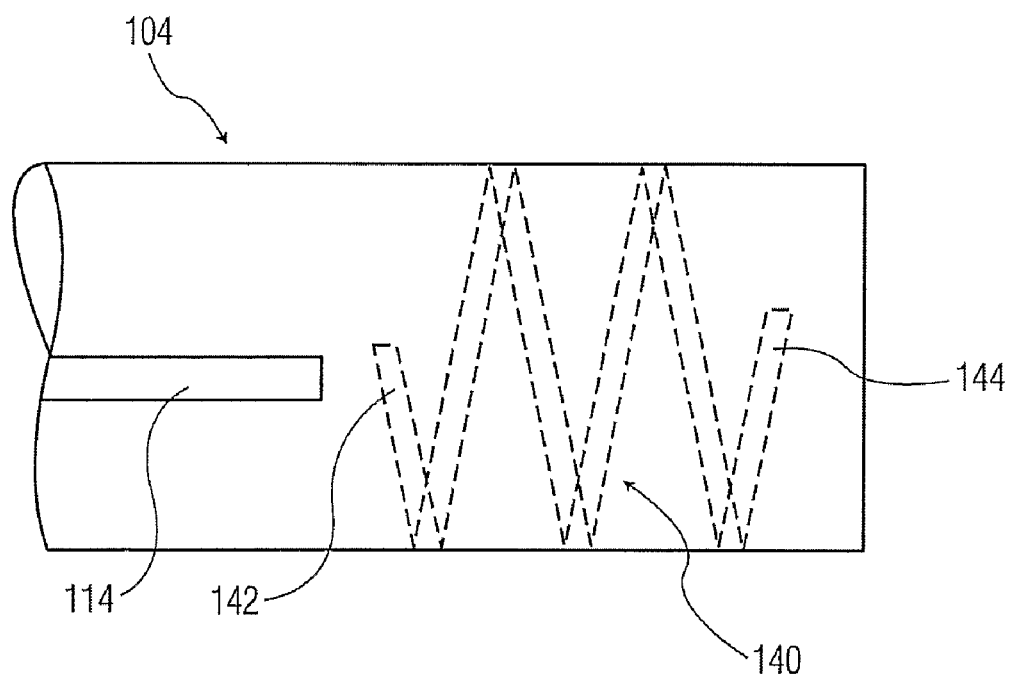
FIG. 10 is a top view of an alternative embodiment for an outer housing of a rollable display device with strain reduction made in accordance with the present invention.

FIG. 10 is a top view of an alternative embodiment for an outer housing of a rollable display device with strain reduction made in accordance with the present invention. The bolt is not received in a cavity, but tracks in a spiral groove 140 formed on the inside wall of the outer housing 104 free of the outer slot 114. The spiral groove 140 is stopped at a first end 142 and a second end 144. The inner housing makes a predetermined number of rotations relative to the outer housing 104, allowing a predetermined length of the rollable display to be deployed. The first end 142 of the spiral groove 140 can be positioned to assure that a desired length of the rollable display remains within the outer housing 104. Those skilled in the art will appreciate that the location of the spiral groove 140 and the bolt can be reversed, with the spiral groove formed on the outside wall of the inner housing and the bolt operably attached to the outer housing. In an alternative embodiment, the bolt is of a fixed length, rather than being spring loaded.

Figure 11:
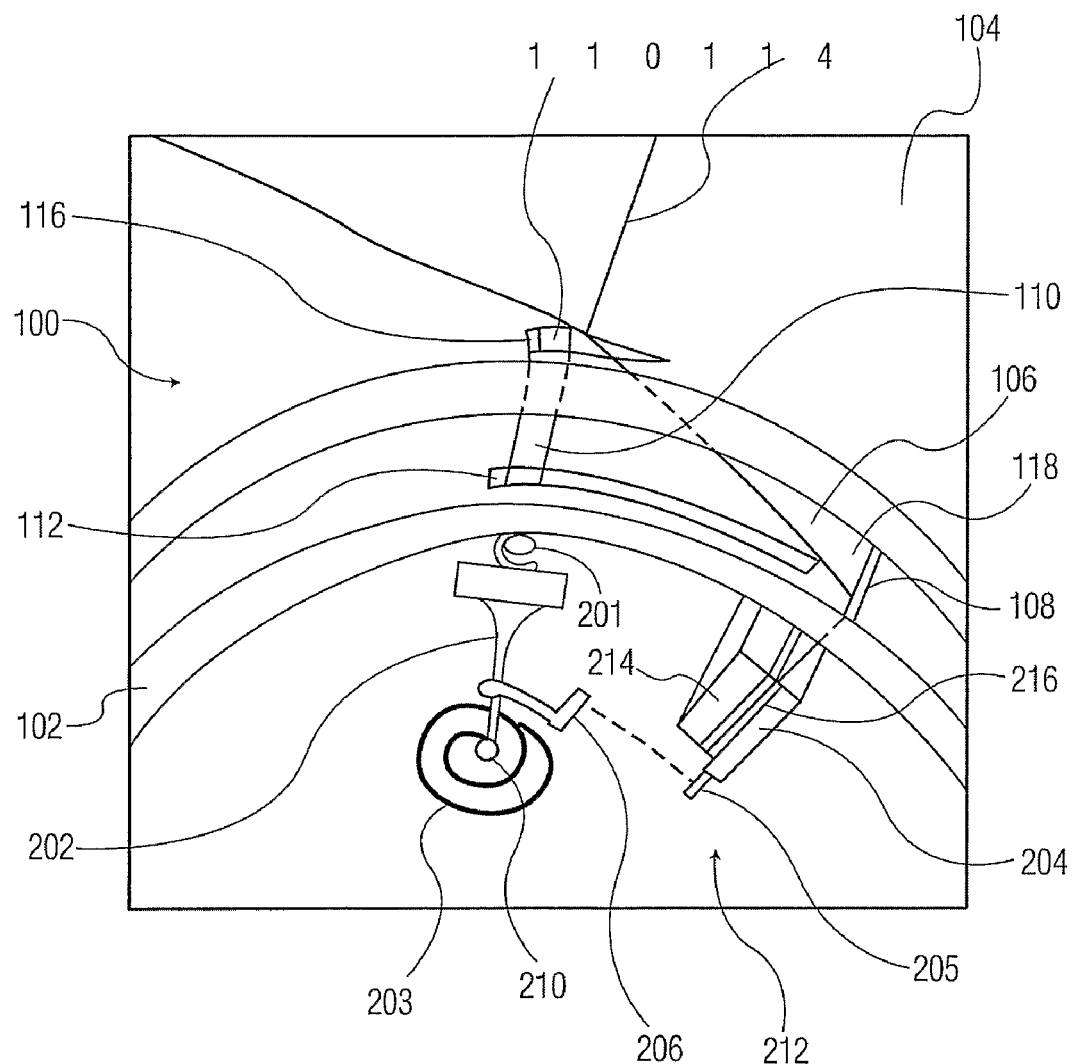
FIG. 11 is a perspective view of another alternative embodiment of a rollable display device with strain reduction made in accordance with the present invention.

FIG. 11 is a perspective view of another alternative embodiment of a rollable display device with strain reduction made in accordance with the present invention. The strain reducer maintains a desired length of the rollable display within the outer housing, reducing cycling and repetitive stress at the bend portion. Aligning the outer slot 114 and the inner slot 108 allows a latch 205 to release the rollable display 106 from a display connection 212.

An outer housing 104 is rotatably disposed about an inner housing 102. The inner housing 102 includes an inner slot 108 and the outer housing 104 includes an outer slot 114. The rollable display 106 has a bend portion 118, which is located at the inner slot 108 of the inner housing 102 where the rollable display 106 passes through the inner housing 102. The rollable display 106 passes through the outer slot 114 of the outer housing 104. In operation, the rollable display 106 rolls around the inner housing 102 when the rollable display 106 is retracted into the outer housing 104.

The strain reducer 100 includes a bolt 110 slidably and movably disposed in an opening 112 in the inner housing 102 and a cavity 116 formed in the outer housing 104. A spring 201, such as a leaf spring or a coil spring, urges the bolt 110 toward the outer housing 104. In one embodiment, the cavity 116 passes through the wall of the outer housing 104. In an alternative embodiment, the cavity 116 passes part way into the wall of the outer housing 104. The bolt 110 and spring 201 are operably connected to mounting 202, which pivots about pin 210, moving the bolt 110 along the length of the opening 112. In one embodiment, the pin 210 and spring 201 are supported by an endcap (not shown) of the inner housing 102. The bolt 110 is moveable from one distance to the inner slot 108 when the bolt 110 is at the end of the opening 112 away from the inner slot 108 to another distance to the inner slot 108 when the bolt 110 is at the end of the opening 112 near the inner slot 108. Spring 203 urges the mounting 202 and bolt 110 toward the end of the opening 112 away from the inner slot 108. A foot 206 is operably connected to the mounting 202 and is aligned to engage a latch 205 of a display connection 212 to disconnect the rollable display 106. The dashed line between the foot 206 and latch 205 indicates the path of the foot 206.

The connection portion 216 of the rollable display 106 is connected to electronics (not shown) by the display connection 212. The display connection 212 includes a connection block 214, a clamp mechanism 204 urged toward the connection block 214 by springs (not shown), and a latch 205. When the foot 206 engages the latch 205 and moves the clamp mechanism 204 away from the connection block 214, the connection portion 216 of the rollable display 106 is released from the display connection 212 and the rollable display 106 can be replaced. Those skilled in the art will appreciate that the display connection 212 can be any connection mechanically and/or electrically engageable with the rollable display 106 that uses a latch to release the rollable display 106.

In operation, the bolt 110 is depressed into the opening 112 by the rollable display 106 when the strain reducer 100 is disengaged. The rollable display 106 separates the bolt 110 from the outer housing 104. The rollable display 106 moves through the outer slot 114 as the rollable display 106 is deployed through the outer slot 114. When the bolt 110 is aligned with the cavity 116, the bolt 110 is received in the cavity 116 so that the strain reducer 100 is engaged. The engaged strain reducer 100 resists further motion of the inner housing 102 relative to the outer housing 104 due to the resistance of the spring 203. This assures that a desired length of the rollable display 106 remains within the outer housing 104, avoiding cycling and repetitive strain on the bend portion 118. The desired length is independent of the total length of the rollable display 106, allowing the rollable display device to be used with different length rollable displays. When the rollable display 106 is retracted into the outer housing 104, the rollable display 106 urges the bolt 110 toward the opening 112.

Through application of additional torque between the inner housing 102 and the outer housing 104 to overcome the resistance of the spring 203, the bolt 110 can be moved to the end of the opening 112 nearer the inner slot 108. In this position, the outer slot 114 and the inner slot 108 are aligned allowing removal and replacement of the rollable display 106. The foot 206 engages the latch 206, moving the clamp mechanism 204 away from the connection block 214, and releasing the connection portion 216 of the rollable display 106. The rollable display 106 can be replaced with a new rollable display 106 in the display connection 212. After replacement, the bolt 110 is rotated toward the end of the opening 112 away from the inner slot 108, disengaging the foot 206 from the latch 206, so that the display connection 212 connects to the connection portion 216 of the rollable display 106.

While the embodiments of the invention disclosed herein are presently considered to be preferred, various changes and modifications can be made without departing from the scope of the invention. Those skilled in the art will appreciate that various designs are possible for the strain reducer 100. For example, the strain reduction approaches discussed separately above can be combined to produce additional protection of the rollable display from repetitive strain. In an alternative embodiment, the bolt 110 is attached to the outer housing 104 and urged toward the inner housing 102, which includes a cavity. The scope of the invention is indicated in the appended claims, and all changes that come within the meaning and range of equivalents are intended to be embraced therein.

The invention claimed is:

1. A rollable display device comprising:
   an inner housing, the inner housing having an inner slot;
   a rollable display, the rollable display having a bend portion, the bend portion being disposed through the inner slot; and
   a strain reducer, the strain reducer operably connected to the rollable display to reduce strain at the bend portion.

2. The device of claim 1 wherein the rollable display comprises a first layer, a second layer disposed on the first layer, and a third layer disposed on the second layer, and the strain reducer comprises a first channel formed in the third layer of the bend portion.

3. The device of claim 1 wherein the strain reducer further comprises a second channel formed in the first layer of the bend portion.

4. The device of claim 1 wherein the rollable display comprises a first layer, a second layer disposed on the first layer, and a third layer disposed on the second layer, and the strain reducer comprises an alternative material portion disposed in the third layer of the bend portion, an alternative material of the alternative material portion being selected for thickness and modulus of elasticity so that the neutral line, which is free of stress when the rollable display is bent, is at or near the third layer of the bend portion.

5. The device of claim 1 wherein the rollable display comprises a first layer, a second layer disposed on the first layer, and a third layer disposed on the second layer, and the strain reducer comprises a fourth layer disposed on the third layer of the bend portion, the material of the fourth layer being selected for thickness and modulus of elasticity so that the neutral line, which is free of stress when the rollable display is bent, is at or near the fourth layer of the bend portion.

6. The device of claim 1 further comprising an outer housing rotatable about the inner housing;
   wherein the strain reducer comprises a spiral groove formed in one of the inner housing and the outer housing; and
   a bolt operably connected to the other of the inner housing and the outer housing, the bolt being disposed in the spiral groove.

7. A rollable display device comprising:
   an inner housing, the inner housing having an inner slot;
   an outer housing, the outer housing being rotatable about the inner housing;
   a rollable display, the rollable display having a bend portion, the bend portion being disposed through the inner slot; and
   means for reducing strain of the bend portion.

8. The device of claim 7 wherein the means for reducing strain comprises means for increasing radius of the bend portion.

9. The device of claim 7 wherein the means for reducing strain comprises means for locating a neutral line of the rollable display at a selected layer of the bend portion.

10. The device of claim 7 wherein the means for reducing strain comprises means for reducing cycling of the bend portion.

11. The device of claim 7 further comprising means for switching, the means for switching being responsive to position of the rollable display.

12. The device of claim 1 further comprising an outer housing rotatable about the inner housing, the outer housing having an outer slot, the rollable display being disposed through the outer slot;
  wherein the strain reducer comprises a first cavity formed in the outer housing at a first distance from the outer slot, a bolt located at a second distance from the inner slot and urged toward the outer housing;
  wherein the bolt is received in the first cavity when the bolt is aligned with the first cavity, and the difference between the first distance and the second distance provides a desired length of the rollable display between the inner slot and the outer slot when the bolt is aligned with the first cavity.

13. The device of claim 12 further comprising a switch responsive to position of the bolt.

14. The device of claim 13 wherein the switch is used to switch a device function selected from the group consisting of drive motor power, electronics power, electronics operating mode, rollable display image power, and rollable display connection.

15. The device of claim 12 wherein the rollable display urges the bolt toward the inner housing when the bolt is not aligned with the first cavity.

16. The device of claim 12 further comprising a second cavity formed in the outer housing at a third distance from the outer slot, and a transition cavity formed in the outer housing between the first cavity and the second cavity.

17. The device of claim 16 wherein the second distance and the third distance are equal.

18. The device of claim 16 wherein the inner housing further comprises electronics, and the rollable display further comprises a connection portion connectable to the electronics, wherein the connection portion is detachable from the electronics when the inner slot is aligned with the outer slot.

19. The device of claim 16 further comprising a switch responsive to movement of the bolt, the switch having a first state when the bolt is received in the first cavity and a second state when the bolt is received in the second cavity.

20. The device of claim 12 wherein the bolt is moveable to a third distance from the inner slot, the inner slot being aligned with the outer slot when the bolt is at the third distance.

21. The device of claim 20 further comprising a foot operably connected to the bolt, a display connection adapted to receive a connection portion of the rollable display and having a latch, wherein the foot is operable to engage the latch and release the connection portion from the display connection when the inner slot is aligned with the outer slot.

22. A rollable display device comprising:
  an inner housing, the inner housing having an inner slot and an opening;
  an outer housing, the outer housing being rotatable about the inner housing, the outer housing having an outer slot and a cavity;
  a rollable display, the rollable display being disposed through the inner slot and the outer slot;
  a bolt, the bolt being slidably disposed in the opening; and
  a spring, the spring urging the bolt toward the outer housing;
  wherein the bolt is received in the cavity when a desired length of the rollable display is positioned between the inner slot and the outer slot.

23. The device of claim 22 further comprising a switch, the switch being responsive to position of the bolt.

* * * * *